United States Patent Office 3,115,505
Patented Dec. 24, 1963

3,115,505
HALOGENATED EPOXY SPIRO INSECTICIDAL
COMPOUNDS
Donald D. Phillips, Modesto, Calif., assignor to Shell Oil
Company, New York, N.Y., a corporation of Delaware
No Drawing. Filed June 8, 1960, Ser. No. 34,627
3 Claims. (Cl. 260—348)

This invention relates to new compositions of matter possessing high toxicity to insects and low toxicity to mammals.

More specifically, this invention relates to a group of polyhalopolycyclic epoxy spiro hydrocarbon compounds and to insecticidal compositions containing these compounds.

In order to be practical and commercially useful an insecticide must meet various requirements. It must of course exhibit a high degree of toxicity toward insects and not be prohibitively expensive. It must lend itself to the various methods of dissemination in insect habitats and then must possess some reasonable amount of residual insecticidal activity. It must remain chemically stable during storage and use. Other requirements for specific purposes may also be added to the foregoing.

Regardless of an insecticide's ability to meet some or all of these requirements, a commercial insecticide for many purposes must be relatively non-toxic to mammals or its employment will be severely limited if not entirely unsuitable. It is obvious that a composition which kills domestic animals and perhaps humans as efficiently as it does insects has little practical value as an insecticide under some circumstances.

Many of the halogenated hydrocarbons that have been discovered have had the serious disadvantage of exhibiting excessive mammalian toxicity and have required special handling and careful or limited use. The compounds of the present invention have substantially overcome this drawback and may therefore be used relatively free despite the possibility of subsequent contact with mammals.

These new compounds also possess the other prerequisites of a commercial insecticide. For example, they are highly stable and retain their toxicity toward insects for long periods of time without loss of their halogen atoms. They also show exceptionaly high residual insecticidal activity.

It is therefore a principal object of this invention to provide a group of insecticides that are simultaneously highly toxic to insects while being relatively non-toxic to mammals.

Another object of this invention is to provide a group of insecticidally active organic compounds which are chemically stable under ordinary conditions of use, particularly in regard to their halogen substituents.

Another object is the production of a group of stable, insecticidally active compounds wtih high degrees of residual insecticidal activity.

A still further object of this invention is to provide means for the production of these new and valuable insect toxicants.

Other objects, features, capabilities and advantages provided by this invention will later appear.

According to this invention, the new compounds are polyhalopolycyclic epoxy spiro hydrocarbons represented by the planar structural formula

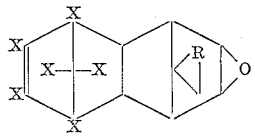

wherein X is a halogen atom and R is an alkylene radical. It is preferred that X is a middle halogen atom, i.e., a bromine or chlorine atom, and is most preferably a chlorine atom. It is also preferred that the alkylene radical R which forms part of a cycloalkyl ring have from 1 to 10 carbon atoms. It is to be particularly noted that this cycloalkyl ring is attached to the remainder of the molecule through a spiro linkage with a methano bridge.

It will be obvious to those skilled in the art that the foregoing planar structure is inclusive of several stereoisomers. The various possibilities for a polycyclic molecule of the type here involved is taught in great detail in U.S. 2,717,851, patented September 13, 1955. The compounds of particular interest of the present invention include those having an endo-endo configuration as described in that patent.

However, the stereochemical configuration of the compounds of the invention has not been determined with absolute certainty. It is believed that the configuration of the products formed by addition of a 1,2,3,4,7,7-hexahalo-bicyclo-(2.2.1)-2,5-heptadiene and a spiro (2,4-cyclopentadiene-1,1'-cycloalkane) is that of a 5,6,7,8,9,9-hexahalo - 1,2,3,4,4a,5,8,8a - octahydro - 1,4 - (1',1') - cycloalkano - endo,endo - 5,8 - methanonaphthalene. The expression endo,endo thus will be used to denote the probable stereochemical configuration and, in any event, to denote the configuration that results when a 1,2,3,4, 7,7 - hexahalo-(2.2.1) - 2,5 - heptadiene is added to a spiro(2,4-cyclopentadiene-1,1'-cycloalkane) in the diene synthesis. Products of this invention produced by the addition of a spiro(cycloalkane-bicycloheptadiene) such as spiro(cyclopropane - 1,7' - bicyclo(2.2.1)-2',5'-heptadiene) and a hexahalo-cyclopentadiene are believed to have the endo,exo configuration; this expression, therefore, when used in the name of products producible in this manner, will be used to denote only the probable configuration but, in any event, that configuration that results when a spiro(cycloalkane-bicycloheptadiene) and a hexahalo-cyclopentadiene are added together by the diene synthesis.

Similarly, the configuration of the epoxy ring is not known with absolute certainty but is believed to be in the exo position when what is believed to be the corresponding endo-endo diene is epoxidized with an organic peracid as will be herein described. The expression exo-epoxy will be used to denote the probable stereochemical configuration and, in any event, to denote the configuration that results when a 5,6,7,8,9,9-hexahalo-1,4,4a,5,8, 8a-hexahydro - 1,4(1',1') - cycloalkano - endo,endo-5,8-methanonaphthalene is epoxidized with an organic peracid.

The present compounds may therefore be described as 5,6,7,8,9,9 - hexahalo - 2,3-epoxy - 1,2,3,4,4a,5,8,8a-octahydro - 1,4(1',1') - cycloalkano - 5,8 - methanonaphthalenes, the compounds of particular interest being described as 5,6,7,8,9,9-hexahalo-exo-2,3-epoxy-1,2,3,4,4a, 5,8,8a - octahydro - 1,4(1',1') - cycloalkano-endo,endo-5,8-methanonaphthalenes, preferably wherein the halogen atoms have atomic numbers lying between 16 and 36, the most preferred halo-substituted compounds being 5,6, 7,8,9,9-hexachloro - exo - 2,3 - epoxy - 1,2,3,4,4a,5,8,8a-octahydro - 1,4(1',1') - cycloalkano - endo,endo - 5,8-methanonaphthalenes. Of most interest are those compounds of this latter group wherein the cycloalkano ring has from 3 to 12 carbon atoms.

Specific examples of compounds within the scope of this invention include among others:

5,6,7,8,9,9-hexachloro-exo-2,3-epoxy-1,2,3,4,4a,5,8,8a-
octahydro-1,4(1',1')-cyclopropano-endo,endo-5,8-
methanonaphthalene;

5,6,7,8,9,9-hexabromo-exo-2,3-epoxy-1,2,3,4,4a,5,8,8a-
octahydro-1,4(1',1')-cyclobutano-endo,endo-5,8-
methanonaphthalene;

5,6,7,8,9,9-hexabromo-exo-2,3-epoxy-1,2,3,4,4a,5,8,8a-octahydro-1,4(1',1')-cyclopentano-endo,endo-5,8-methanonaphthalene;

5,6,7,8,9,9-hexachloro-exo-2,3-epoxy-1,2,3,4,4a,5,8,8a-octahydro-1,4(1',1')-cyclododecano-endo,endo-5,8-methanonaphthalene;

5,6,7-trichloro-8,9,9-tribromo-exo-2,3-epoxy-1,2,3,4,4a,5,8,8a-octahydro-1,4(1',1')-cyclohexano-endo,endo-5,8-methanonaphthalene;

5,6,7,8-tetrachloro-9,9-dibromo-exo-2,3-epoxy-1,2,3,4,4a,5,8,8a-octahydro-1,4(1',1')-cyclononano-3'-ethyl-endo,endo-5,8-methanonaphthalene.

These new and remarkable compounds can in general be prepared by a diversity of means. While the present invention should in no sense be limited by any particular means, it is preferred to prepare these novel compounds by the epoxidation of the corresponding halogenated polycyclic spiro dienes.

The corresponding dienes may be prepared by reacting 1,2,3,4,7,7-hexahalobicyclo(2.2.1)-2,5-heptadiene with a spiro (2,4-cyclopentadiene-1,1'-cycloalkane) by heating the reactants in liquid phase at a temperature and for a time sufficient for appreciable product formation.

Corresponding dienes suitable as starting materials for the preparation of compounds included within the scope of this invention and having one or more other stereochemical configurations may be prepared by reacting a spiro (cycloalkane-cyclopentadiene) with acetylene to give a spiro (cycloalkane-bicycloheptadiene) and reacting the latter compound with a hexahalocyclopentadiene, the reactions occurring by heating the reactants in liquid phase at a temperature and for a time sufficient for appreciable product formation.

It will be apparent to those well versed in the art that any desired corresponding diene of a compound of this invention may be prepared by the selection of proper reactants. Thus, the method of preparing the corresponding diene of the preferred chlorine substituted compounds comprises reacting 1,2,3,4,7,7-hexachlorobicyclo-(2.2.1)-2,5-heptadiene with a spiro[2,4-cyclopentadiene-1,1'-cycloalkane] by heating the reactants in liquid phase. Similarly, corresponding dienes of compounds of this invention having any particular cycloalkano substituent on the methano bridge are prepared by employing as a starting reactant the spiro compound consisting of a 2,4-cyclopentadiene and the particular cycloalkane desired as the substituent on the product.

In general, the conditions employed in the Diels-Alder diene synthesis will most readily produce these dienes. In the majority of cases, the reactions proceed rapidly and well at temperatures between 80–150° C. and at atmospheric pressure or at pressures which are only slightly above atmospheric pressure over a three to twenty-four hour time period.

These corresponding dienes can also be prepared in the presence of suitable solvents. The rate of reaction will be highest if the solvent chosen has a boiling point above 80° C. For this purpose, chlorobenzene, xylene, dibutyl ether, etc. can advantageously be chosen. Solvents such as benzene, toluene, butyl alcohol, and dioxane can also be used but an increase in reaction time will then be necessary.

In general, the synthesis is carried out in approximately equimolar quantities of reactants. It has been found to be advantageous to use a small excess of the halogenated heptadiene reactant.

The 5,6,7,8,9,9-hexahalo-exo-2,3-epoxy-1,2,3,4,4a,5,8,8a - octahydro - 1,4(1',1') - cycloalkano - endo,endo-5,8-methanonaphthalenes of this invention may then be formed by the method which comprises epoxidizing a 5,6,7,8,9,9 - hexahalo - 1,4,4a,5,8,8a - hexahydro - 1,4-(1',1')-cycloalkano-5,8-methanonaphthalene with an organic peracid, the diene being prepared as indicated above. It is preferred to use an organic peracid selected from the group consisting of perbenzoic acid and monoperphthalic acid. For example, the preferred chloro-substituted compounds of most interest are prepared by epoxidizing a 5,6,7,8,9,9-hexachloro-1,4,4a,5,8,8a-hexahydro - 1,4(1',1') - cycloalkano - endo,endo - 5,8 - methanonaphthalene with one of these organic peracids. Similarly, a compound of this invention with any particular cycloalkyl ring is obtained from the corresponding diene.

The epoxidation reaction can readily be accomplished with these compounds by standard procedures for this reaction utilizing various oxidizing agents. While it is preferred to use monoperphthalic acid or perbenzoic acid in a suitable inert solvent such as dioxane or chloroform, other organic peracids such as peracetic and other solvents may be used.

The details of the method are best described by reference to the following examples. It is to be understood that these examples are offered for illustrative purposes only and are not to be construed as limiting the present invention.

*Example I*

Over a period of ¾ hour, 22 grams (0.24 mole) of spiro-[4.2]-1,3-heptadiene ($n_D^{25}$ 1.5073) was added to 84 grams (0.28 mole) of 1,2,3,4,7,7-hexachlorobicyclo-(2.2.1)-2,5-heptadiene (B.P. 113–114° C. at 1.8 mm.) with stirring while maintaining the temperature at 80–90° C. The temperature was then slowly raised to 140° C. over a 5-hour period. The reaction mixture changed from yellow to red to brown in color.

The reaction mixture solidified when cooled to room temperature. The brown mass was triturated with cold hexane and filtered to afford 53 grams of tan crystals, M.P. 165–169° C. Yield=56%.

Ten grams of this product was recrystallized from hexane (about 12 ml./g.) and identified as 5,6,7,8,9,9-hexachloro - 1,4,4a,5,8,8a - hexahydro - 1,4(1',1') - cyclopropano-endo,endo-5,8-methanonaphthalene with a melting point of 169–170° C. Identification was based on infrared analysis and the following elemental analysis:

| $Cl_6C_{14}H_{10}$ | C | H | Cl |
|---|---|---|---|
| Calculated | 43.0 | 2.6 | 54.4 |
| Found | 42.8 | 2.6 | 54.4 |

*Example II*

7.82 grams (0.02 mole) of the compound prepared in Example I was mixed with 35 ml. of 0.61 N monoperphthalic acid in dioxane and heated to 50° C. for three days. The solution was neutralized with sodium carbonate and diluted with water. The product was recrystallized from hexane, yielding 6.36 grams of colorless crystals with a M.P. of 163–166° C.

The same reaction was run, the only change being that the reaction mixture was carefully heated to reflux where it was held for four hours. This resulted in a quantitative recovery of a compound with a M.P. of 163–166° C.

Infrared analysis of this compound showed that it was an epoxide. The compound was then submitted for elemental analysis with the following results:

| $OCl_6C_{14}H_{10}$ | C | H | Cl |
|---|---|---|---|
| Calculated | 41.32 | 2.48 | 52.28 |
| Found | 40.7 | 2.6 | 51.7 |
|  | 40.8 | 2.6 | 51.8 |

The compound prepared was 5,6,7,8,9,9-hexachloro-exo-2,3-epoxy-1,2,3,4,4a,5,8,8a-octahydro - 1,4 - (1',1')-cyclopropano-endo,endo-5,8-methanonaphthalene.

Compounds within the scope of this invention where the epoxy group is in the endo position rather than the exo position may be prepared with comparative ease from the exo compound. For example, if an exo-2,3-epoxyhexahalopentacyclo spiro compound of the type herein described is treated with acetic acid at temperatures in the vicinity of 100° C. in the presence of a catalyst, such for example, as sulfuric acid, a hydroxy acetate is obtained. This hydroxy acetate, by treatment with phosphorus tribromide, or other reagents equally well suited for the purpose, can be converted to a bromo-acetate. This latter compound, on treatment with alkali, is hydrolyzed and dehydrogenated to give an endo-2,3-epoxyhexahalopentacyclo spiro compound of the type herein described.

*Example III*

Eight grams of anhydrous sodium acetate was added to 100 ml. of 40% peracetic acid. Then a solution of 43 g. (0.11 mole) of the compound prepared in Example I in 190 ml. of benzene was added to the peracetic acid solution in several portions over 15 minutes while maintaining a temperature of 25–35° C. The solution was stirred vigorously at room temperature for 17 hours. 300 ml. of water was then added to the solution resulting in the separation of two phases. The organic phase was washed with water, potassium carbonate solution, water, and finally saturated salt solution. The organic phase was then dried over $MgSO_4$ followed by evaporation to a volume of about 50 ml. 35 g. (79% yield), M.P. 164–165.5° C. of 5,6,7,8,9,9-hexachloro-exo - 2,3-epoxy - 1,2,3,4,4a,5,8,8a-octahydro-1,4-(1′,1′)-cyclopropano-endo,endo - 5,8-methanonphthalene was obtained.

*Example IV*

The compound of Example II was also prepared from a solution of 5.0 grams (0.0125 mole) of the compound of Example I in 30 ml. of 0.5 M perbenzoic which was allowed to stand at room temperature for 15 days. This method resulted in a total yield of 3.5 grams, or 67% yield.

These new products of my invention possess, as has already been noted, great practical usefulness as insect toxicants. They exhibit a high degree of toxicity to a wide variety of insects. The compound prepared in Example II was taken as illustrative of the compounds of this invention and put through a series of tests to demonstrate its high level of toxicity to various insects. The results are tabulated in Examples V–VII.

*Example V*

Grasshoppers and corn earworms were exposed to sprayed broad beans held in a green house.

| Ounces per Acre Sprayed with Compound of Example II | Percent 48-Hour Mortality at Days after Treatment | | | | | |
|---|---|---|---|---|---|---|
| | Grasshoppers | | | Corn Earworm | | |
| | 1 | 3 | 7 | 1 | 3 | 7 |
| 4 | 100 | 100 | 73 | 87 | 47 | 27 |
| 8 | 100 | 100 | 80 | 100 | 93 | 47 |
| 16 | 100 | 100 | 100 | 100 | 100 | 93 |
| Untreated | 7 | 20 | 0 | 0 | 0 | 0 |

*Example VI*

Houseflies were exposed to sprayed pinto bean leaves both in the laboratory and outside.

| Pounds/Acre of Compound of Example II | Stored in— | Percent 24-Hour Mortality at Days after Treatment | | | |
|---|---|---|---|---|---|
| | | 0 | 1 | 4 | 7 |
| 1 | Laboratory | 83 | 43 | 5 | 43 |
| 1 | Outside | 52 | 36 | 37 | 39 |

*Example VII*

In tests against *Anopheles albimanus* larvae, the compound of Example II proved itself to be exceptionally effective, possessing a toxicity to the larvae several times greater than other insecticides that have previously been used for this purpose. For instance, in tests against the larvae where dieldrin was used as a standard and assigned a rating of 100, the superior relative toxocity of the compound of Example II was shown by achieving a toxicity index rating of 277. In tests against adult *Anopheles albimanus*, the compound of Example II has also shown itself to be of exceptional value. For example, initial trials of deposits on glass showed that dosages as low as 5 mg. per square foot gave almost complete control of adult *Anopheles albimanus* after four-and-a-half months.

Further evidence of the compound's great residual toxicity is demonstrated by the following tabulated data in which a 50% wettable powder of the compound of Example II was sprayed onto plywood at 25 mg./sq. ft. and the mortality of adult *Anopheles albimanus* recorded at the indicated times.

| | Percent Mortality at Weeks Indicated | | | |
|---|---|---|---|---|
| | Fresh | 1 | 3 | 4 |
| Compounds of Example II | 100 | 100 | 100 | 100 |
| Untreated Check | 0 | 10 | 0 | 20 |

On the other hand the compounds of this invention, as exemplified by the compound of Example II, have demonstrated an extremely low toxicity to mammals and find commercial uses not otherwise open to them. Illustrative of the minimal adverse effect on mammals is the high dosage required to achieve an LD-50 in mice and rats. The results are found in Example VIII.

*Example VIII*

The compound of Example II was administered to mice and rats and the quantity in mg./kg. required to achieve an LD-50 was recorded. It was determined that the value for mice was 111 and for rats it was 77. The significance of these values will be appreciated when compared to the LD-50 of Endrin whose values are 12 and 25 for mice and rats, respectively.

The new compositions of matter of this invention are soluble in all of the common organic solvents and they can be utilized as insect toxicants in all the ways customary in the art. Thus they can be dissolved in the insecticide base oils normally employed and the resulting solutions sprayed or otherwise employed in the usual fashion. They can also be combined with finely divided carriers to produce wettable and non-wettable insecticidal dusts, they can be used in the presence of emulsifying agents, with water, and with water and oils to form insecticidal emulsions. They can also be incorporated in aerosol compositions, and, in general, they can be used either as the sole insect toxicant in an insecticidal composition or in combination with other insecticides in order to obtain combination properties and other desirable characteristics.

The unusual properties and great stability of these new compounds make them particularly suitable in a number of less common but highly desirable applications for insecticidal materials. Thus, they can be added to paints, lacquers, varnishes, and polishing waxes which, after application, will give surfaces possessing a high order of insect toxicity. They can be added to paper products of all types either by suitable impregnation of the finished paper materials, or by incorporation during the manufacturing process. Similarly they can be added to tackifiers, plasticizers, printing inks, rubber products, etc., in order to provide finished objects possessing inherent toxicity to insect life and resistance to insect attack. They can also be added to various types of plastics and plastic sheetings in order to obtain packaging and wrapping materials themselves resistant to insect attack and able to protect objects packed in them from such attack. Because of their high resistance to the action of alkali, these new compositions can be incorporated into white washes and other similar surface coatings. Those skilled in the art will, of course, recognize that many other similar uses for these unique compounds are possible, all of which follow from the special combination of valuable properties possessed by them.

I claim as my invention:

1. The compound having the formula:

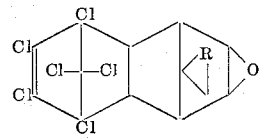

wherein R represents an alkylene radical containing from 1 to 10 carbon atoms.

2. The compounds according to claim 1 having the exo-epoxy, endo,endo-methanonaphthalene stereochemical configuration.

3. The compound having the formula

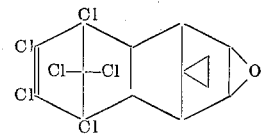

and the exo-epoxy, endo,endo-methanonaphthalene stereochemical configuration.

References Cited in the file of this patent
UNITED STATES PATENTS

| | | | |
|---|---|---|---|
| 2,583,569 | Herzfeld et al. | Jan. 29, | 1952 |
| 2,676,131 | Soloway | Apr. 20, | 1954 |
| 2,676,132 | Bluestone | Apr. 20, | 1954 |
| 2,736,730 | Kleiman | Feb. 28, | 1956 |
| 2,795,526 | Goodhue et al. | June 11, | 1957 |
| 2,886,485 | Barthel et al. | May 12, | 1959 |

FOREIGN PATENTS

| | | | |
|---|---|---|---|
| 773,431 | Great Britain | Apr. 24, | 1957 |